United States Patent [19]
Dennis et al.

[11] Patent Number: 5,613,793
[45] Date of Patent: Mar. 25, 1997

[54] CONCEALED FIXING DEVICE

[76] Inventors: Mark A. Dennis, 2 Larkspur Close, South Normanton, Derbyshire, DE55 3NL; Martyn A. Cotterill, 26 Roseberry Street, Kirkby-in-Ashfield, Nottinghamshire, NG17 7FZ, both of England

[21] Appl. No.: 386,885

[22] Filed: Feb. 10, 1995

[51] Int. Cl.⁶ .................................................. F16B 12/56
[52] U.S. Cl. ............................. 403/256; 403/8; 403/230; 403/257; 411/104; 411/368; 5/298
[58] Field of Search .............................. 403/230, 231, 403/239, 240, 256–261, 6–8, 20, 405.1, 406.1, 407.1, 385, 401; 411/386, 104, 368, 154–156; 5/293, 298, 301

[56] References Cited

U.S. PATENT DOCUMENTS

| | | | |
|---|---|---|---|
| 126,630 | 5/1872 | Gilbert | 5/298 |
| 167,118 | 8/1875 | Pritchett | 403/260 X |
| 721,292 | 2/1903 | Forster | 5/298 X |
| 2,597,835 | 5/1952 | Eksergian | 411/368 X |
| 5,358,309 | 10/1994 | Fedele | 411/104 X |

FOREIGN PATENT DOCUMENTS

| | | | |
|---|---|---|---|
| 0228930 | 7/1987 | European Pat. Off. | |
| 1449806 | 7/1966 | France | 403/8 |
| 16011 | 3/1927 | Netherlands | 403/258 |
| 311753 | 2/1956 | Switzerland | 403/8 |
| 417750 | 10/1934 | United Kingdom | |
| 543966 | 3/1942 | United Kingdom | |
| 1025013 | 4/1966 | United Kingdom | |
| 1204404 | 9/1970 | United Kingdom | |
| 2051285 | 1/1981 | United Kingdom | |
| 2127122 | 4/1984 | United Kingdom | |
| 2246407 | 1/1992 | United Kingdom | |

*Primary Examiner*—Harry C. Kim
*Attorney, Agent, or Firm*—Paul & Paul

[57] ABSTRACT

A concealed fixing device comprises an insert embedded within a first member, an elongate threaded bar connected to the first member and passing through a second member through a concealed hole to a concealed chamber within the second member. A combined nut and washer assembly applied to the threaded bar tightens the first and second members.

3 Claims, 3 Drawing Sheets

CONCEALED FIXING DEVICE

FIELD OF INVENTION

The present invention relates to a concealed fixing device and more particularly to a fixing device suitable for wooden furniture.

BACKGROUND OF INVENTION

Wooden furniture, for example pine frame beds, is now often supplied in a flat pack for assembly at home.

Certain sections such as for example the bed ends, top (headrest) and bottom are often assembled in the factory by gluing and by the use of dowels or mortise and tenon etc. These can be neatly assembled without any unsightly fixing members being visible.

KNOWN PRIOR ART

A known system for assembling the elongate side members or rails to the head and foot sections is to insert a bolt through each end member and to provide each side member with a suitable bracket through which the bolt can be inserted and tightened with a suitable nut.

Though this results in a satisfactory mechanical fixing, it is aesthetically not pleasing because the end of the bolt is visible.

OBJECT OF INVENTION

It is an object of the present invention to provide a concealed fixing device for a bed or similar article which cannot be detected from the outside of the bed.

BRIEF DESCRIPTION OF INVENTION

The present invention provides a concealed fixing device for a wooden bed or similar article comprising an elongate screw thread male member, a permanently embedded female member fixed within a first member of said bed or similar article and co-operating with said elongate screw thread member to hold it in a fixed position, a preshaped combined washer and nut assembly co-operating with said elongate screw thread member and a second member of said bed or similar article to provide a secure fixing, and second member being so shaped that access to said combined washer and nut assembly is only available from an inside surface and such that said combined washer and nut assembly is not visible when said bed or similar article is assembled in which said combined washer and nut assembly is shaped such that the washer shape co-operates with the side of said blind cylindrical hole to secure said second member to said first member, and in which said nut is only partially internally threaded and is provided with an enlarged internal diameter section to provide a lead in section for prevention of cross threading when fitted onto said elongate male threaded member.

Preferably said second member of said bed or similar article is provided with a blind cylindrical hole in a major surface thereof, said blind cylindrical hole also being provided with an elongate hole at one side thereof to provide entry for said elongate male member.

BRIEF DESCRIPTION OF DRAWINGS

Embodiments of the present invention will now be described, by way of example with reference to the accompanying drawings in which.

DESCRIPTION OF PREFERRED EMBODIMENTS

Figure 1:
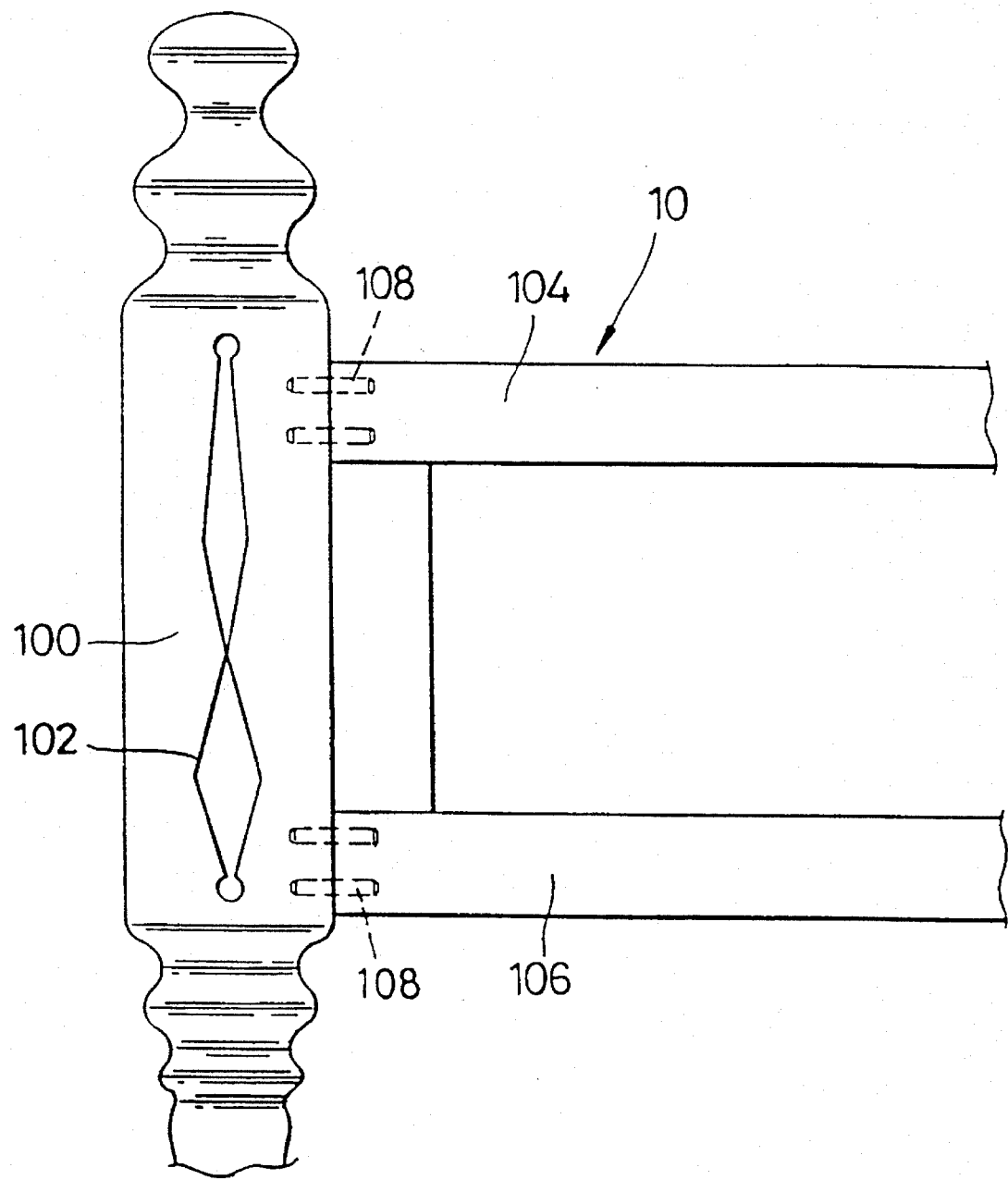
FIG. 1 shows a view of part of an article of furniture such as a bed, in end elevation.

With reference to the drawings, FIG. 1 shows a portion of an article such as a bed or other item. This is preferably made of wood but could be made from plastics or other suitable material.

For ease of description the term bed will now be used but it is to be understood that this may cover other articles which require to be flat packed.

Similarly, the term wood will be used but it is to be understood that this may cover other materials such as plastics, composites etc.

In FIG. 1, the head (or foot) end of the bed 10 is shown comprising an upright post member 100 with an ornamental moulded portion 102. The side members 104, 106 may be fixed to the upright post member 100 permanently within a factory environment by means for example dowels (shown dotted) and suitable adhesive or mortise and tenon joints.

Figure 2:
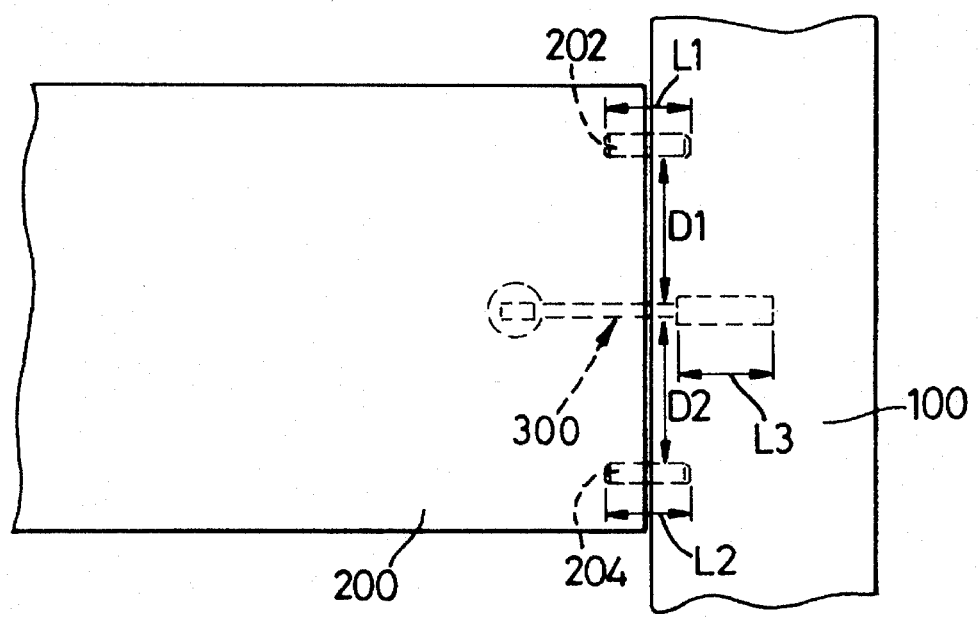
FIG. 2 shows a part of the article of FIG. 1 in side elevation illustrating the concealed fixing device according to the present invention.

The upright end of the post member 100 does not show any fixing member for the side member 200 as shown in FIG. 2.

Figure 3:
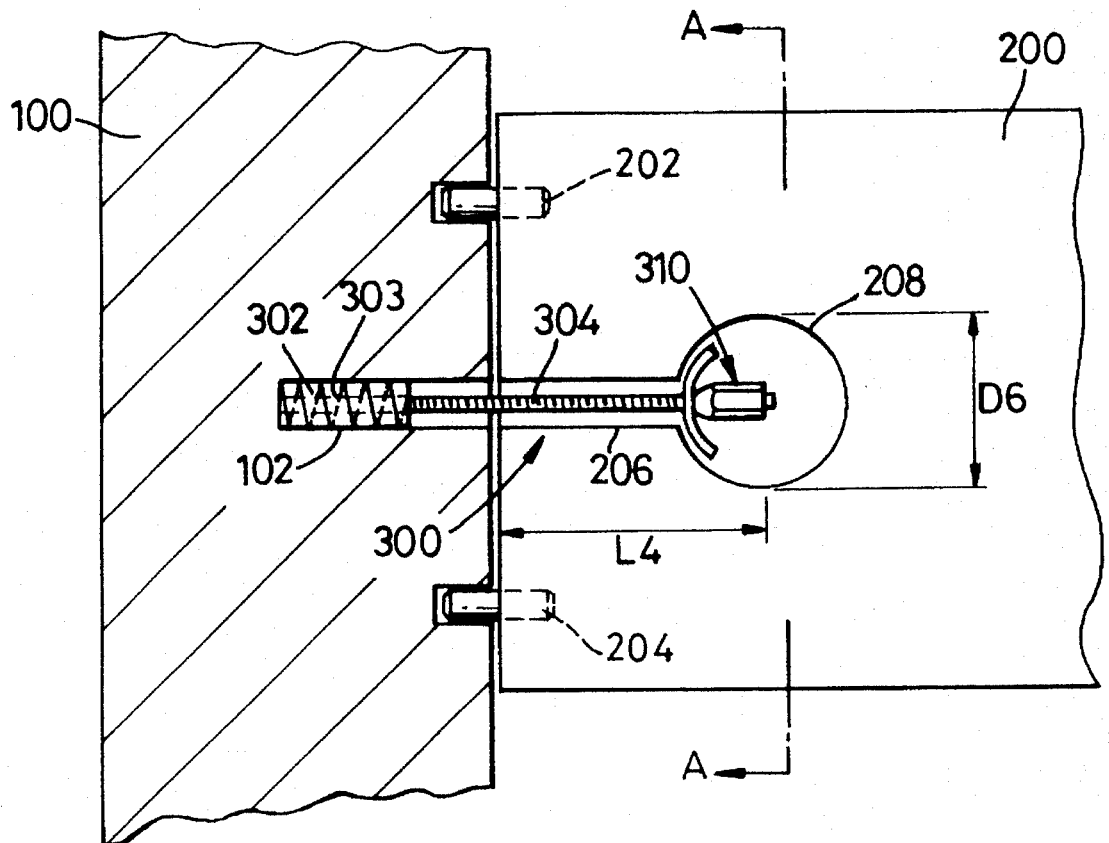
FIG. 3 shows the part of the article of FIG. 2 viewed from the inside of the article.

With refrence to FIG. 2, the side member 200 also does not show any fixing member externally. The fixing means for the side member 200 are shown dotted and comprise two dowels 202, 204 which are inserted into the upright post member 100 to protrude therefrom, and also the concealed fixing device 300 according to the present invention which is shown in more detail in FIG. 3.

The concealed fixing device 300 comprises a steel insert 302 which is inserted into a receiving hole 102 in upright post member 100 and secured therein by a coarse external wood screw type thread 303 which secures the insert permanently within upright post member 100.

In a preferred embodiment the steel insert 302 has an external diameter of 16 mm and a core diameter of 11.5 mm the insert being provided with a wood screw type thread at 4.5 mm pitch along its entire length of 40 mm.

A threaded bar 304 (preferably 85 mm long and threaded M8) is screwed into insert 302 which is internally threaded to receive it. The bar 304 is inserted through a longitudinally drilled hole 206 in side member 200 to allow the end of the bar 304 to be accessible to application of a combined nut and washer 310 within an enlarged hole 208 drilled in a sideways direction on the inside of member 200. These sizes could be suitably scaled down to M6 or M4 for smaller sections.

Figure 5:
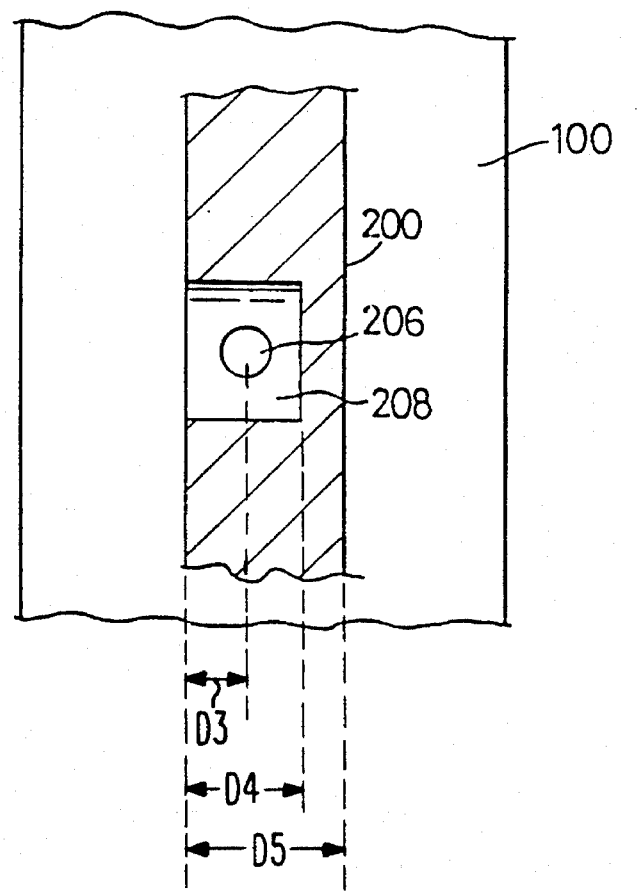
FIG. 5 shows a cross-sectional elevation on line A—A of FIG. 3.

The cross-section of side member 200 on line A—A (with combined nut and washer 310 removed) is shown in FIG. 5.

Figure 4:
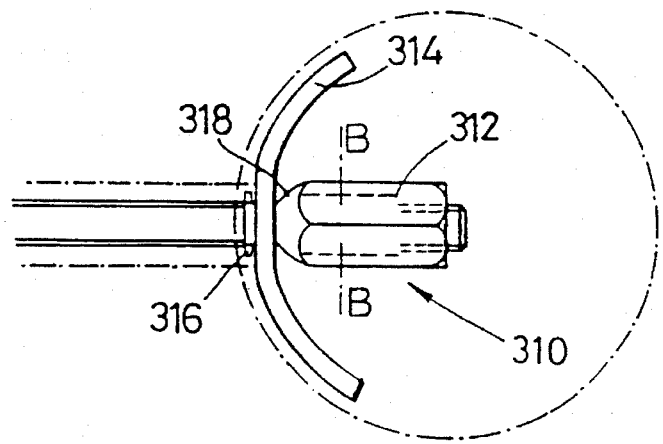
FIG. 4 shows in greater detail the fixing member of FIG. 3.

The combined nut and shaped washer 310 is shown in greater detail in FIG. 4.

The nut 312 is a hexagonal nut (preferably 13 mm A/F 18 mm O/A length) which is threaded (preferably M8 internal) for a defined length (preferably 7 mm) and is bored out on its opposite end (to the left of dotted line B—B) for a defined depth (preferably 12 mm) to a larger diameter (preferably 8.5 mm) to provide a relatively long lead in to ensure that no cross threading occurs during assembly of the nut 312 onto bar 304.

The shaped washer 314 is held on nut 312 by a turned over portion 316 which holds washer 314 and nut 312 together but allows nut 312 to rotate relative to washer 314 but retains it closely enough to ensure that washer 314 rotates freely but without jamming against the tapered portion 318 of nut 312.

Washer 314 is shaped to conform to the internal shape of hole 208 so that when the nut 312 is tightened onto threaded bolt 304 side member 200 is accurately tightened onto leg 100 applying equal pressure onto both dowels 202, 204 and thereby ensuring that side member 200 is firmly secured to the leg 100.

The invention therefore provides a concealed fixing for a bed (as defined) which enables a piece of furniture to be assembled without any part of the fixing device being visible.

The provision of a combined nut and washer ensures that the washer can firstly not be omitted, and secondly that it cannot be misplaced. Often in assembling kits of parts the washers are dropped and then not fitted by workmen who are in a hurry.

Also, the shaped washer cannot be fitted the wrong way round.

The elongate lead-in ensure that cross threading cannot occur. This is particularly important where the structure is held by a single nut and bolt since cross threading will result in a loose joint which with the substantial forces to which furniture is subjected will often result in splitting of the wooden frame or cracking of any plastic frame members.

Thus the combination of the combined nut and washer and elongate lead-in ensures that the structure is easily and correctly assembled and remains so for the life of the furniture. Adjustment is possible if timber movement takes place by simple use of a spanner.

In a practical embodiment the following dimensions are preferred:

D1 (FIG. 2)=32 mm
D2 (FIG. 2)=32 mm
L1 (FIG. 2)=32 mm
L2 (FIG. 2)=32 mm
L3 (FIG. 2)=42 mm
L4 (FIG. 3)=50 mm
D3 (FIG. 5)=11 mm
D4 (FIG. 5)=23mm
D5 (FIG. 5)=27.5 mm (minimum)
D6 (FIG. 3)=35 mm

We claim:

1. A concealed fixing device assembly, in combination with a wooden bed comprising a first upright post member and a second horizontal side member, comprising a concealed fixing device, wherein said concealed fixing device comprises a first female insert member, a second elongate screw threaded bar member and a third combined nut and washer member, in which said first female insert member is permanently embedded into said first upright post member, in which said elongate screw threaded bar member is threaded into the first female insert member to be held in a fixed position outstanding from said first upright post member, in which said second horizontal side member comprises a first external major surface and a second internal major surface extending along its length, first upper edge surface and a second lower edge surface extending along its length and a first end surface and a second end surface, said first end surface being shaped to conform to the first upright post member and to be fixed thereto by said concealed fixing device, in which said second horizontal side member is provided with an elongate hole drilled into its first end surface and an enlarged hole drilled into its second internal major surface at a predetermined distance from said first end surface, in which the enlarged hole comprises a blind hole which is drilled only partially through the width of the second horizontal side member so as to not be visible from the first external major surface, in which the elongate hole forms a through hole connecting the first end surface with the enlarged blind hole, in which the elongate screw threaded bar member is sized to protrude through said elongate hole in said second horizontal side member and to present a portion of the elongate screw threaded bar member within said enlarged blind hole when said first upright post member and said second horizontal side member are positioned in a correct assembly position, in which said third combined nut and washer member comprises a preshaped washer and nut, said preshaped washer being retained on said nut and being freely rotatable relative to said nut, in which said nut is internally threaded to be co-operate with a surface of the elongate screw threaded bar member, in which said preshaped washer is shaped to co-operate with a surface of the enlarged blind hole adjacent to said elongate hole, in which said nut is only partially internally threaded and is provided with an enlarged internal diameter section to provide a lead in section for prevention of cross threading when said combined nut and washer member is fitted onto said elongate screw threaded bar member, and in which said preshaped washer is substantially larger than size of the nut to provide a spread of pressure within said enlarged blind hole.

2. The combination as claimed in claim 1, in which the preshaped washer is held on said nut by a turned over portion of said nut in which said turned over portion is dimensioned to allow the washer to rotate freely relative to the nut.

3. The combination as claimed in claim 2, in which the first female insert member, the second elongate screw threaded bar member and the third combined nut and washer member are all made of steel.

* * * * *